US008547422B2

(12) United States Patent
Surman

(10) Patent No.: US 8,547,422 B2
(45) Date of Patent: Oct. 1, 2013

(54) MULTI-USER AUTOSTEREOSCOPIC DISPLAY

(76) Inventor: Philip Surman, Middlesex (GB)

(*) Notice: Subject to any disclaimer, the term of this patent is extended or adjusted under 35 U.S.C. 154(b) by 786 days.

(21) Appl. No.: 12/451,380

(22) PCT Filed: May 12, 2008

(86) PCT No.: PCT/GB2008/001645
§ 371 (c)(1),
(2), (4) Date: May 12, 2010

(87) PCT Pub. No.: WO2008/139181
PCT Pub. Date: Nov. 20, 2008

(65) Prior Publication Data
US 2010/0259604 A1 Oct. 14, 2010

(30) Foreign Application Priority Data

May 11, 2007 (GB) ................................. 0709134.1

(51) Int. Cl.
H04N 13/04 (2006.01)
(52) U.S. Cl.
USPC .................. 348/54; 348/42; 348/51; 359/458
(58) Field of Classification Search
None
See application file for complete search history.

(56) References Cited

U.S. PATENT DOCUMENTS

| 5,872,590 A | 2/1999 | Aritake |
| 6,593,957 B1 * | 7/2003 | Christie ........................ 348/42 |
| 2004/0193413 A1 * | 9/2004 | Wilson et al. .................. 382/209 |

FOREIGN PATENT DOCUMENTS

| JP | 08-076057 | 3/1996 |
| JP | 08-076057 A | 3/1996 |

OTHER PUBLICATIONS

International Search Report; International Application No. PCT/GB2008/001645; Dated: Sep. 4, 2008.
International Written Opinion of the International Searching Authority; International Application No. PCT/GB2008/001645; Dated: Sep. 4, 2008.
International Search Report; International Application No. PCT/GB2008/001645; International Filing Date: May 12, 2008.

* cited by examiner

*Primary Examiner* — Thu Nguyen
*Assistant Examiner* — Nam Tran
(74) *Attorney, Agent, or Firm* — Rader, Fishman & Grauer PLLC

(57) ABSTRACT

A display apparatus for projecting images towards eyes of at least one viewer selectively when said eyes are spaced horizontally within a viewing field, said apparatus comprising: transmitting means for transmitting light; image generation means for generating different images, the image generation means being capable of generating image parts in a plurality of different vertical image areas; and light configuration means for configuring said transmitted light to provide a plurality of sets of vertical light configurations, the different configurations in each set being selectable to provide different emergent light characteristics for a vertical image area which is common to each configuration in a set and which is different for each set, whereby said different images are projected by said apparatus to coincide with one or more eyes selected from the eyes of each of the one or more viewers, and not one or more other eyes of the viewers.

19 Claims, 18 Drawing Sheets (a)

(b)

(a)

(b)

(a) Source Position at Time $t_1$ (b) Source Position at Time $t_2$ (c) Source Position at Time $t_3$ (a) Rays at Time $t_1$ (b) Rays at Time $t_2$ (c) Rays at Time $t_3$ (a) Plan View (b) Side View

MULTI-USER AUTOSTEREOSCOPIC DISPLAY

FIELD OF THE INVENTION

The present invention relates to the field of autostereoscopic display devices where viewers who do not have to wear special glasses can see three-dimensional (3D) images. In particular, but not exclusively the invention relates to supplying stereo images to several viewers who have a relatively high degree of freedom of movement.

BACKGROUND OF THE INVENTION

Prior art 3D displays have been described in a large variety of publications, including "New Autostereoscopic Display System", Ezra, Woodgate, Omar, Holliman, Harrold and Shapiro (1995), SPIE Proceedings "Stereoscopic Displays and Virtual Reality Systems H" Vol. 2409, pp 31-40; "Retroreflective Screens and their Application to Autostereoscopic Displays" Harman, SPIE Proceedings "Stereoscopic Displays and Virtual Reality Systems IV", Vol. 3012, pp 145-153; "Stereoscopic Display Employing Head-position Tracking using Large Format Lenses", Hattori, (1993), SPIE Proceedings "Stereoscopic Displays and Applications N" Vol. 1915, pp 2-5; "Three-Dimensional Display with Focused Light Array" Kajiki, Yoshikawa, and Honda (1996), SPIE Proceedings "Practical Holography X" Vol. 2652 pp 106-116; "Perfect 3-Dimensional Movies and Stereoscopic Movies on TV- and Projection Screens; An Appraisement", Klein and Dultz (1990), SPIE Proceedings "Stereoscopic Displays and Applications" Vol. 1256, pp 289-295; "Stereoscopic Liquid Crystal Display II (Practical Application)", Nishida, Hattori, Sakuma, Katayama, Omori and Fukyo (1994), SPIE Proceedings "Stereoscopic Displays and Virtual Reality Systems", Vol. 2177, pp 150-155; "Lenticular Stereoscopic Display System with Eye-Position Tracking and without Special-Equipment Needs", Omura, Tetsutani and Kishino (1994), SID 94 Digest, pp 187-190; "Head-Tracking Stereo Display: Experiments and Applications", Paley (1992), SPIE Proceedings "Stereoscopic Displays And Applications III", Vol. 1669, p 88; "Head Tracking Stereoscopic Display", Schwartz (1985), Proceedings of IEEE. International Display Research Conference, pp 141-144; "Parallax Barrier Display Systems" Sexton (1992), IEE Colloquium "Stereoscopic Television" Digest No: 1992/173, pp 5/1-5/5; U.S. Pat. No. 5,712,732; "3D-TV Projection Display System with Head Tracking", Tetsutani, Ichinose and Ishibashi (1989), Japan Display '89, pp 56-59; "A Study on a Stereoscopic Display System Employing Eye-position Tracking for Multi-viewers", Tetsutani, Omura and Kishino (1994), SPIE Proceedings "Stereoscopic Displays and Virtual Reality Systems", Vol. 2177, pp 135-142; "Autostereoscopic Display using Holographic Optical Elements", Trayner and Orr (1996), SPIE Proceedings "Stereoscopic Displays and Applications VII", Vol. 2653, pp 65-74; "Developments in Autostereoscopic Displays using Holographic Optical Elements", Trayner and Orr (1997), SPIE Proceedings; and "Observer Tracking Autostereoscopic 3D Display Systems", Woodgate, Ezra, Harrold, Holliman, Jones and Moseley (1997), SPIE Proceedings "Stereoscopic Displays and Virtual Reality Systems IV", Vol. 3012, pp 187-198.

3D displays have been used in a variety of niche applications for many years, and as the quality of the display systems has improved, so too has the range of applications. Broadcast television is probably the largest potential application, however the requirements of a television system are complex and few, if any, existing display systems can meet these requirements.

There are various desirable requirements for a display suitable for a broadcast television system. It would be desirable to provide a display that can present stereo images to several viewers who will occupy a typical 'living room' sized region. Such a system is more complex than those intended for single viewers proposed, for example, for computer monitor or arcade game applications.

The overall size of the display should preferably not be excessive, as is the case with some systems, for instance those where there is a moving pair of projectors for each viewer. A basic requirement for a domestic television display is that it will fit through a door. It is anticipated that the size of the proposed display will be no greater than that of current back-projected televisions.

Some prior art autostereoscopic displays operate by providing regions in front of the screen where a left image only is seen across the complete width of the screen, and adjacent regions where a right image only is seen. These regions are referred to as the exit pupils. The positions of these exit pupils follow the viewers' eye positions by being controlled by the output of a head position tracker that determines where the viewers' eyes are located in front of the screen. The advantage of head tracking is it enables stereoscopic images to be seen in a manner that places the least demands on the amount of information that has to be displayed.

European patent application EP-A-1102106 relates to a stereoscopic image display apparatus constructed to guide a parallax image displayed on a display to the left eye and to the right eye of an observer, thereby permitting the observer to stereoscopically observe the image information displayed on the display. The apparatus also permits a plurality of observers to observe the stereoscopic image simultaneously.

Prior art systems which use an array of cylindrical lenses for producing vertical exit pupils have drawbacks when used in a 3D display. Firstly, off-axis aberrations limit the off-axis performance so that the display would not provide exit pupils over a region sufficiently wide for multiple-user applications. Secondly, it is difficult to make the boundaries between the lenses invisible.

It is an object of the invention to provide an improved display.

SUMMARY OF THE INVENTION

In accordance with the present invention, there is provided a display apparatus for projecting images towards eyes of at least one viewer selectively when said eyes are spaced horizontally within a viewing field, said apparatus comprising:

transmitting means for transmitting light;

image generation means for generating different images, the image generation means being capable of generating image parts in a plurality of different vertical image areas; and light configuration means for configuring said transmitted light to provide a plurality of sets of vertical light configurations, the different configurations in each set being selectable to provide different emergent light characteristics for a vertical image area which is common to each configuration in a set and which is different for each set, the sets including:

a first set of vertical light configurations which are projected from a first substantially planar area towards a second substantially planar area, each of said first set of vertical light configurations having a different first-set horizontal projection position and a different first-set horizontal angular projection characteristic when projected from said first substantially planar area and different first-set horizontal angular emergent characteristics when emergent from said second substantially planar area; and a second set of vertical light configurations which are projected from said first substantially planar area towards said second substantially planar area, each of said second set of vertical light configurations having a different second-set horizontal projection position and a different second-set horizontal angular projection characteristic when projected from said first substantially planar area and having different second-set horizontal angular emergent characteristics when emergent from said second substantially planar area, whereby said different images are projected by said apparatus to coincide with one or more eyes selected from the eyes of each of the one or more viewers, and not one or more other eyes of the viewers.

The present invention provides an improved display, which is a projection display which includes different light configuration means which provides different sets of vertical light configurations which each correspond to a particular vertical image area, but allow different eyes to receive images which correspond to the image areas for each set.

By changing the sets consecutively, for example by means of a horizontal scan, the entire image may be produced, and by changing the images for each respective eye in a motion picture image, multi-viewer 3D video images may be produced.

Further features and advantages of the invention will become apparent from the following description of preferred embodiments of the invention, given by way of example only, which is made with reference to the accompanying drawings.

DETAILED DESCRIPTION OF THE INVENTION

Figure 1:
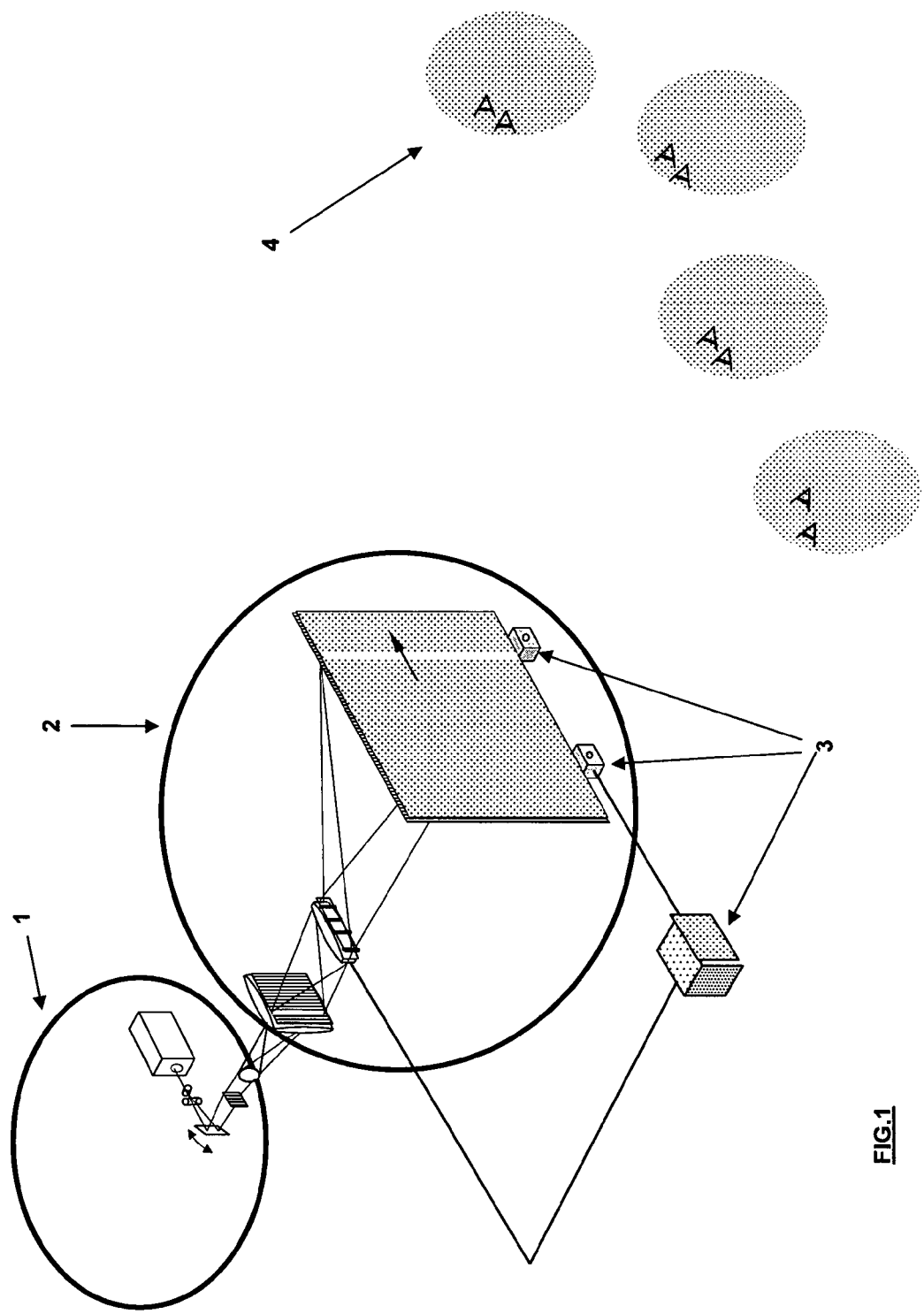
FIG. 1 shows a simplified schematic diagram of the display and viewers in the viewing field.

In accordance with embodiments of the invention, the display operates by producing regions in the viewing field referred to as exit pupils where a viewer's eye can see the image on the screen that is intended for that eye. FIG. 1 is a schematic diagram of the display, comprised of image generation means 1, light configuration means 2, and a pupil position tracker 3. The image generation means 1 may be comprised of a plurality of different components which will be discussed in turn when describing different embodiments of the present invention. The image generation means 1 generates images which are observable by one or more selected viewer's eyes 4 when positioned at an exit pupil. The light configuration means 2 is used to manipulate the propagating beams of light so as to steer exit pupils to positions substantially coincident with the one or more viewer's eyes 4 in the viewing field. In preferred embodiments the light configuration means 2 is used to provide a plurality of sets of vertical light configurations, which are steered to positions in the viewing field substantially coincident with the position of one or more viewer's eyes 4. The light configuration means 2 is arranged such that an exit pupil is formed in the vertical light configurations at positions in the viewing field substantially coincident with the one or more viewer's eyes 4. Light configuration means 2 may be comprised of a number of different components in different embodiments of the present invention. A pupil position tracker 3 is used to control optics in order for the exit pupils to follow the positions of the selected eyes. In preferred embodiments of the present invention the pupil position tracker 3 is enabled with a means for measuring and recording the three dimensional spatial position of the one or more viewer's eyes 4. In an alternative embodiment the pupil position tracker 3 only measures the longitudinal and latitudinal position of the one or more viewer's eyes 4. The measured position data of the one or more viewer's eyes 4 is used to configure light configuration means 2, thereby steering one or more exit pupils to positions substantially coinciding with the positions of the one or more viewer's eyes 4.

In preferred embodiments of the present invention a plurality of exit pupils are formed at a plurality of positions in the viewing field. In preferred embodiments an image is observable at any vertical position along the exit pupils contained in the vertical light configurations. This allows for viewer eye movement in a substantially vertical direction without requiring the exit pupils to be re-directed. Should a viewer's eye move in either a horizontal or longitudinal direction with respect to the screen, then the light configuration means 2 must reconfigure itself to steer the exit pupil to the current eye position of the viewer. In preferred embodiments the invention is able to track one or more moving viewer's eye positions and to continuously project images to the current eye positions of the one or more viewers 4. Such embodiments require light configuration means 2 to be capable of reconfiguring itself, such that one or more exit pupils are steered to positions substantially coinciding with one or more viewer's eye positions on the basis of the continuously generated pupil position data, generated by pupil position tracker 3. Light configuration means 2 must reconfigure itself sufficiently fast such that no observable interruption of the continuously projected image sequence is observable by the one or more moving viewer's eyes.

In preferred embodiments of the present invention the image generation means 1 comprises means for generating colour images. In preferred embodiments these means may comprise a light source means for generating light, and means for modulating the intensity and wavelength of the generated light to project colour images. Such means may be provided by one or more different apparatus. It is envisioned that the current invention may be adapted to function with a plurality of different means for generating colour images, some embodiments will be described in the specification, others will not. Some embodiments may require reconfiguration of the image generation means 1 and are within the sphere of knowledge of the skilled person. It is intended that such different embodiments fall within the scope of the current specification, despite not being specifically described.

In preferred embodiments an RGB (Red Green Blue) colour model is employed, wherein different amounts of red, green, and blue colour are mixed to generate any desired colour and intensity.

In a preferred embodiment three different light sources are used, one red, one green, and one blue. The light sources may be traditional coloured lamps or LEDs (light emitting diodes), or alternatively in preferred embodiments lasers are used. Preferably three lasers are used, each laser generating a different wavelength of visible light—red, green, and blue. The use of lasers as light sources has clear advantages over the customary use of lamps or LEDs as their low etendue facilitates the control of light required in this application and their narrow bandwidth provides an increased colour gamut.

In preferred embodiments grating light valve (GLV) device image generation means are used. In general such systems involve reflecting each of the primary colours (red, green, blue) off a variable grating structure and superposing the diffracted orders to generate a colour image. In one embodiment of the present invention a Grating Electromechanical System (GEMS) may be used. In an alternative embodiment an LCOS (liquid crystal on silicon) in conjunction with a MEMS (micro-electrical-mechanical systems) scanner may be used. In yet another alternative embodiment a MEMS device is used in conjunction with modulated lasers. It is envisaged that other image generation means utilising variable gratings are used in the current invention. The use of grating image generation means requires slight design modifications to the image generation means 1 illustrated in FIG. 1. Such modifications are widely known to the skilled persons in the art, and do not affect the light configuration means 2.

Figure 2:
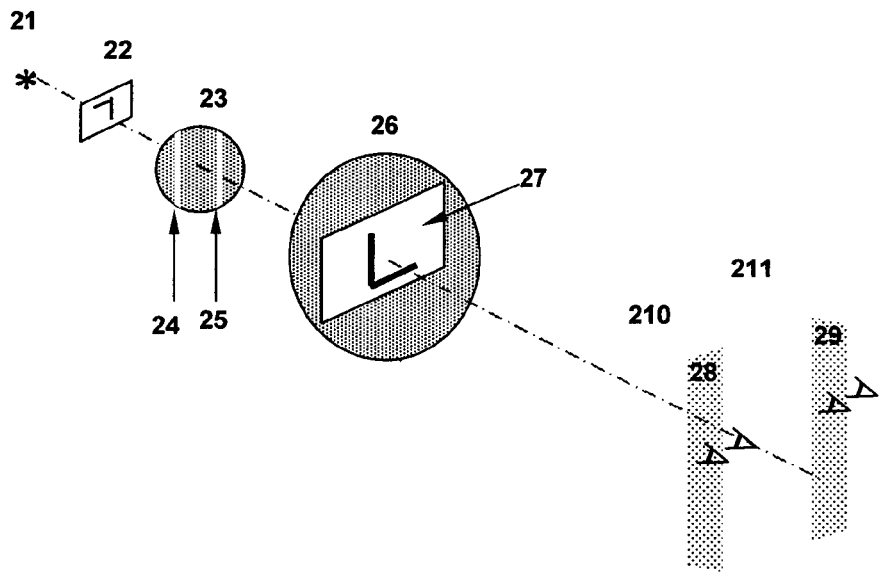
FIG. 2 shows a simplified optical equivalent of the display, illustrating the manner in which one or more exit pupils are formed.
Figure 2:
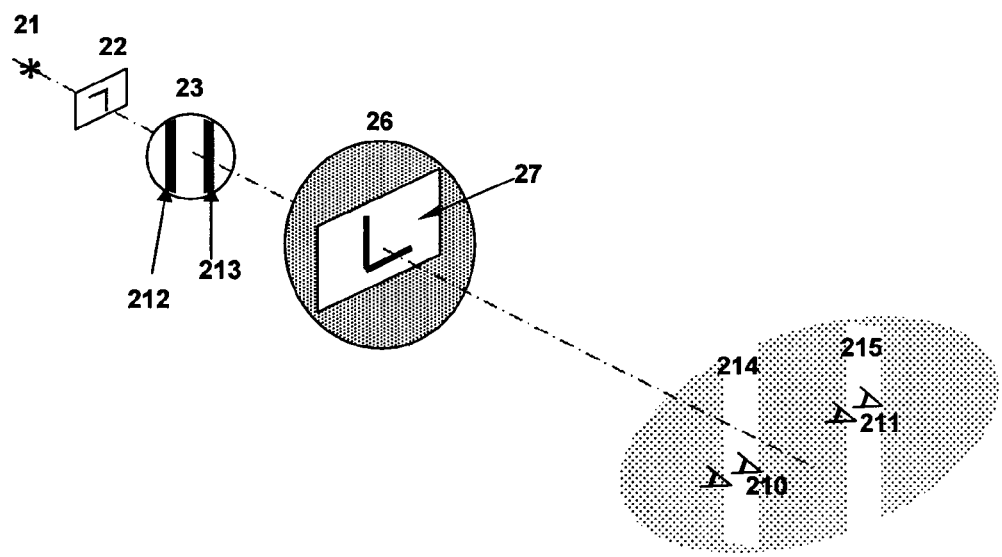

FIG. 2(*a*) is a simplified optical equivalent of the display and illustrates the manner in which one or more exit pupils 28 and 29 are formed. It should be noted that regions receiving illumination in the vicinity of the viewers 210 and 211 are depicted by shading. The image 27 is intended to be seen by the left eyes of the viewers 210 and 211 that are located in the exit pupil regions 28 and 29. Image 27 is formed on a second substantially planar area, represented by convex lens 26 in the current embodiment, by projection from an image generation means, which may comprise a two-dimensional light valve 22, via a first substantially planar area, represented by the convex projector lens 23 comprising apertures 24 and 25. For illustrative purposes the current figure depicts an entire image 27 projected on the second substantially planar area (convex lens 26), the image being generated by light valve 22. In practical embodiments of the present invention a vertical image area of light valve 22 is illuminated at any one time, thereby projecting a vertical image portion of image 27 onto the second substantially planar area (convex lens 26) at any one instant in time. A set of vertical light configurations is projected from the first substantially planar area (convex projector lens 23) to the second substantially planar area (convex lens 26), thereby projecting image 27 onto the second substantially planar area (convex lens 26). Each of the set of vertical light configurations projected from the first substantially planar area has a different horizontal projection position, different horizontal angular projection characteristic, and different horizontal angular emergent characteristic when emergent from the second substantially planar area (convex lens 26). However, each of the configurations in a set of vertical light configurations shares a common vertical image area, and as such each configuration in a set will project the same vertical image portion in the viewing field. The emergent vertical light configurations are steered to the one or more viewer's eye positions when the eyes are positioned in the viewing field. The second substantially planar area (convex lens 26), effectively forms the screen of the display. The image generation means may comprise both a light valve 22 and an illumination source 21, which may be used to illuminate light valve 22, thereby modulating the wavelength and intensity of the transmitted light. The first substantially planar area (projector lens 23), has vertical apertures 24 and 25 adjacent to it that enable light to pass to the convex lens 26 in the form of vertical light configurations. These apertures form real images 28 and 29 in the viewing field via the convex lens 26. These images are the exit pupils 28 and 29. Lateral movement of the apertures 24 and 25 gives lateral movement of the exit pupils 28 and 29 and allows lateral movement where the movement is controlled by the output of a pupil position tracker 3 (FIG. 1). The apertures 24 and 25 are not seen by the viewers 210 and 211 as they are in the Fourier transform plane of lens 23.

Different images are presented to the eyes by employing temporal multiplexing in order to show images in sequence. For example, FIG. 2 shows a left image being presented simultaneously to two left eyes. If stereo is to be seen by the viewers then a right image will be presented in the following frame and the exit pupils shifted to the right eyes. A left image is presented in the following frame and the exit pupils shifted back to the left eyes and so on. If motion parallax is to be seen by two viewers then four images are presented in sequence such that four perspectives, corresponding to the images required for each of the four eyes, are produced and displayed to the appropriate eye by directing the exit pupil to it. The number of images displayed is dependent on the speed of the components, in particular on the speed with which the image generation means 1 is able to generate images, and the speed with which the projector lens 23 is able to reposition its vertical apertures 24 and 25, thereby steering exit pupils to positions in the viewing field substantially coinciding with the one or more viewer's eyes. For example, this method could present eight completely different images to eight different regions in the viewing field if necessary, provided sufficiently fast components are employed.

FIG. 2(b) illustrates another means of selecting the eyes that see the image. In this case the lens 23 has two vertical regions 212 and 213 adjacent to it that block the light. This creates the 'shadow' regions 214 and 215 where the light to the right eyes of the viewers 210 and 211 is blocked. It should be noted that whether exit pupils are generated or 'shadow' regions are generated this does not affect the principle of operation of the display. The means for steering the shadow regions is identical to the means for steering the exit pupils, albeit in one embodiment vertical light configurations are steered, and in the other vertical shadow regions are steered to positions in the viewing field substantially coinciding with one or more viewer's eyes. In the remainder of the description the term 'exit pupil' is used, and may refer to any region wherein an eye-specific image is observable either by steering of shadow regions or exit pupils. Furthermore the skilled reader will recognize that each of the embodiments described in this specification could function equally well using either exit pupil steering or shadow region steering, and it is understood that all such embodiments fall within the scope of this specification. Also, although two viewers are shown each seeing the same left image in their left eyes, this is only one example of a range of modes of operation.

In alternative embodiments each of the one or more viewer's eyes observes a different perspective image of the same object image, allowing parallax to be displayed, such that different viewers observe a different perspective stereo image of the same object image. In an alternative embodiment each viewer may observe a different image of a different object image. For example such an embodiment may allow one or more viewers to each watch a different "television channel," or a different video signal simultaneously on one display. Such embodiments may be referred to as private viewing embodiments as only the selected viewer is able to observe the specific image. In yet another embodiment each viewer may observe the same images. Each embodiment may operate in either a single user mode, wherein only a single viewer is observing projected images in exit pupils in the viewing field, or in a multi-user mode of operation in which a plurality of exit pupils are formed in the viewing field, and are intended to be viewed by a plurality of different viewers. Furthermore each embodiment of the current invention may project either mono or stereo images. In further embodiments of the current invention each viewer may observe the same stereo image or a different stereo image.

In preferred embodiments of the present invention the image generation means 1 comprises a plurality of vertical image areas, preferably horizontally spaced with respect to each other. In certain embodiments the vertical image areas may be vertical pixel columns of a light valve. In preferred embodiments light configuration means 2 is adapted to provide a plurality of sets of vertical light configurations, wherein the different configurations in each set are selectable and provide for different emergent light characteristics for a vertical image area which is common to each configuration within a set. The sets may include a first set of vertical light configurations projected from a first substantially planar area towards a second substantially planar area, wherein each of the configurations within the first set has a different first-set horizontal projection position, and different first-set horizontal angular projection characteristic when projected from the first substantially planar area, and has a different first-set horizontal angular emergent characteristics when emergent from the second substantially planar area. The sets may also include a second set of vertical light configurations projected from a first substantially planar area towards a second substantially planar area, and each of the second set of vertical light configurations has a different second-set horizontal projection position, and a different second-set horizontal angular projection characteristic when projected from a first substantially planar area, and has a different second-set horizontal angular emergent characteristics when emergent from the second substantially planar area. Each different set of vertical light configurations is associated with a different vertical image area. The complete image projected to one or more viewer's eyes is comprised of a plurality of different emergent light characteristics from a plurality of vertical image areas, sequentially projected to each viewer's eye via a plurality of sets of vertical light configurations.

In preferred embodiments of the present invention the light configuration means 2 (FIG. 1) is adapted to sequentially activate the first and second set of vertical light configurations, thereby providing for horizontal scanning across the second substantially planar area, and wherein each of the different sets of vertical light configurations are associated to different vertical image areas. The complete image may be thought of as a raster scan, wherein the different sets of vertical light configurations sequentially project raster images, corresponding to different vertical image portions of a complete image, onto the second substantially planar area. In preferred embodiments the frequency of one image scan is at least 60 Hz, thereby satisfying the critical flicker frequency requirements. The more different images the display is projecting and hence the more different images being scanned across the second substantially planar area, the greater the scanning frequency is required to be. In embodiments projecting stereo images displaying motion parallax (the 'look-around' effect), the image projected to each viewer's eye is different, and each different image must have a repetition rate of 60 Hz at the second substantially planar area. When operating in a single user mode, this requires a scanning frequency of 120 Hz; 60 Hz per viewer eye. The more viewers are present the higher the scanning frequency. In embodiments where four viewers are observing the display, the frequency of the scan is at least 480 Hz—i.e. eight images every 16.7 milliseconds (60 Hz). If instead parallax is not displayed and the same stereo images are projected to a plurality of different viewers then the same eye-specific image may be simultaneously projected to the selected eye of each of the viewers by the plurality of sets of vertical light configurations, before simultaneously projecting a different eye-specific perspective image of the same object image to the other eyes of each of the viewers. In such embodiments an eye-specific image is projected either to all the right eyes of the plurality of viewers and then to all the left eyes of the plurality of viewers, or vice versa—the order in which the eye-specific images are projected is irrelevant. In such embodiments the number of different viewers does not affect the scanning frequency rate, as the number of different eye-specific images generated is constant and is always two per stereo image. The number of different viewers only affects the number of different vertical light configurations which must be simultaneously generated by the first substantially planar area. To accommodate the different embodiments of the present invention the image generation means 1 must be capable of generating a number of different images in a short period of time. Furthermore light configuration means 2 must be capable of short response times to sequentially activate the different vertical light configurations required to satisfy the second substantially planar area scanning frequency requirements, such as the critical flicker frequency requirement. The exact frequency at which the light configuration means 2 must generate different vertical light configurations, and hence the response time is also dependent on the number of different vertical image areas comprising the complete image, since each vertical light configuration projects one vertical image area onto the display.

Figure 3:
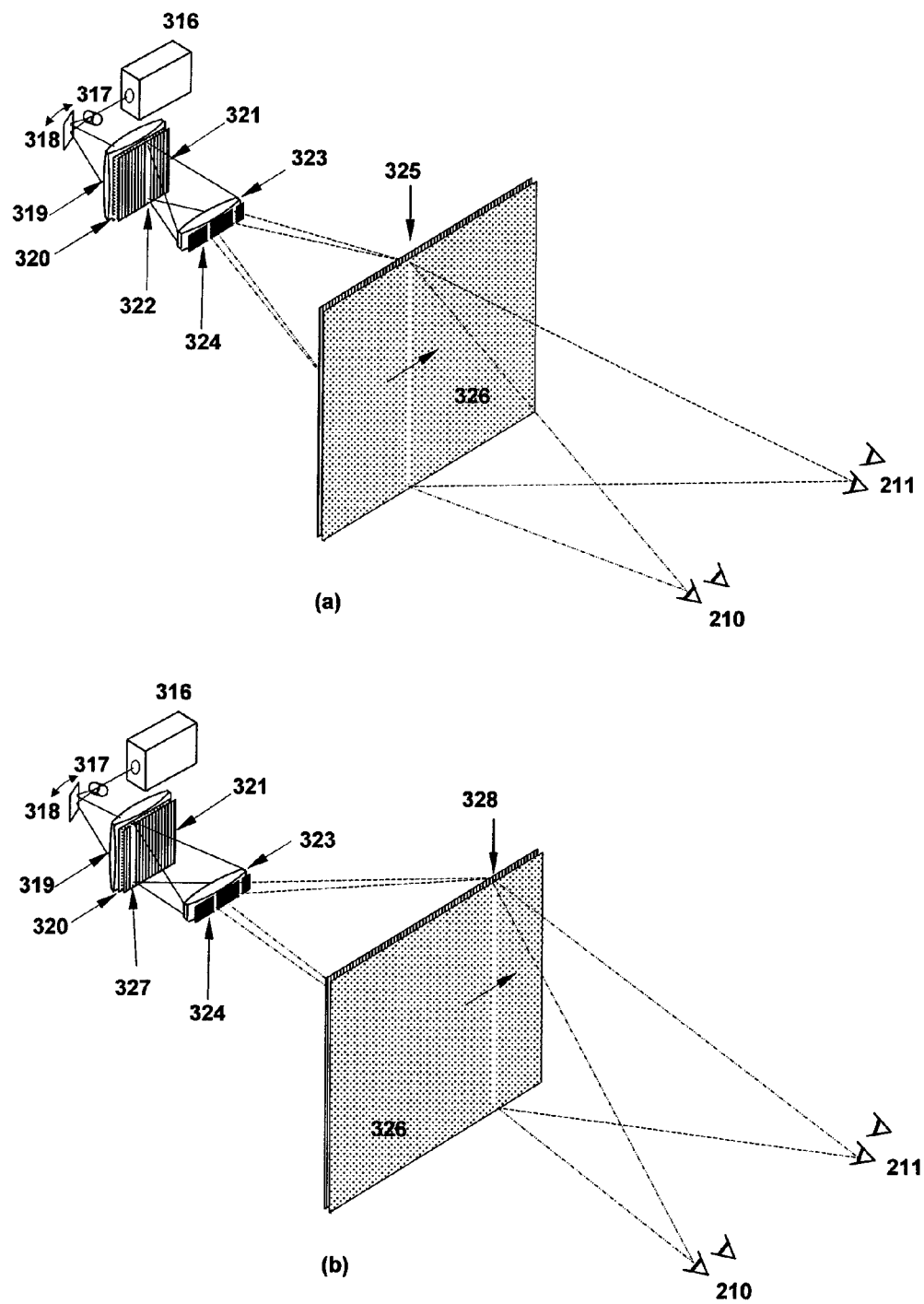
FIG. 3 shows perspective views of a simplified embodiment of the display, and shows the beams directed to the required eyes at different times during the horizontal scan of the image column.

In FIG. 3 a simplified embodiment of the display is depicted. Its basic operation is to project the image produced on a 2D light valve 320 on to the screen 326 via a lens 323. The light valve attenuates light with a two-dimensional matrix of pixels that enable an image to be formed. This device may be transmissive as in this figure or it may be reflective. The light configuration means comprises means for spatially modulating the light, to thereby provide for a plurality of sets of vertical light configurations. In certain embodiments the spatially modulating means may be a linear spatial light modulator (SLM) 324. The linear spatial light modulator (SLM) 324 comprises a horizontal array of elements that either transmit or block light and the device may be transmissive as shown in FIG. 3 or reflective. The elements of this are controlled by the output of a pupil position tracker 3 (FIG. 1).

In alternative embodiments the spatial light modulator (SLM) 324 may be a MEMS device, which may be either transmissive or reflective. The response time of MEMS devices is very short, such that a plurality of vertical light configurations may be generated in a very short period of time, and as such is well suited to be used as a spatial light modulator 324. In embodiments where the MEMS is a reflective grating structure, the angle of reflected vertical light configurations may be varied by varying the grating structure, thereby steering the vertical light configurations.

In another preferred embodiment the SLM 324 may be comprised of a ferroelectric light valve, chosen for its fast reaction times.

In yet a further embodiment the SLM 324 may be a transmissive or reflective LCOS (liquid crystal on silicon).

In alternative embodiments it is envisioned that the SLM 324 may be a transmissive or reflective light valve with a sufficiently fast reaction time to accommodate for the different embodiments of the invention. FIG. 3 illustrates an embodiment of how an image is projected to one or more viewers in the viewing field. In the depicted embodiment the light configuration means is comprised of transmitting means for transmitting light which has angular variation; converging means for focusing the transmitted light to a common position on the second substantially planar area and a spatially modulating means for modulating the transmitted light between the first and second substantially planar areas. In preferred embodiments the transmitting means may be comprised of convex lens 319 and horizontal diffuser 321. Convex lens 319 substantially focuses transmitted light at the first substantially planar area (SLM 324 in the current embodiment), whilst the horizontal diffuser diffuses the transmitted light in a substantially horizontal direction. The image generation means is comprised of light source 316, beam shaping optics 317, a horizontal scanning device 318, and a means for modulating the wavelength and intensity of incident light, which in this embodiment is a two dimensional (2D) light valve 320 placed between convex lens 319 and horizontal diffuser 321. In preferred embodiments light source 316 may be one or more lasers. However other light sources may be used in conjunction with any described embodiment, as previously disclosed. In preferred embodiments the horizontal scanning device 318 is a MEMS. In alternative embodiments a rotating mirror scanner may be used. FIG. 3 illustrates the manner in which the display forms an image by a horizontal scan of a vertical column of the two dimensional light valve 320. The vertical column being equivalent to the vertical image area discussed in previous embodiments. Light from the laser 316 passes through beam shaping optics 317 that produces a vertical fan of rays. Laser 316 generates a laser beam having a Gaussian beam profile, the diameter of which steadily increases with increasing distance from the source. Furthermore the intensity is non-uniform, having a Gaussian distribution, wherein the intensity tends to be concentrated around the transmission axis. The beam shaping optics 317 at least partly distributes the intensity uniformly in a vertical direction to minimise intensity discrepancies in the generated light, and increases the cross-sectional surface area of the generated light to produce a vertical fan of rays. The vertical fan of rays uniformly illuminate a vertical column of the 2D light valve 320, producing different emergent light characteristics for different illuminated vertical columns of the light valve 320. The vertical fan of rays are scanned in the horizontal direction by the scanning device 318. The scanned fan of rays illuminates the 2D light valve 320 via the convex lens 319. In FIG. 3(*a*) a column of illumination is positioned as indicated by 322 at a given time $T_x$. This illumination is scattered in the horizontal direction by diffuser 321 in order for the light to enter the complete width of the lens 323. Lens 323 focuses the output of the scanner 318 on the screen 326 Light from 323 passes through a spatial light modulator (SLM) (the first substantially planar area in this embodiment), which in preferred embodiments may be a 2D light valve 324 allowing selected rays to pass through it. These rays form a column of the image 325 on the screen 326 through being focused by lens 323. In preferred embodiments lens 323 focuses the transmitted rays in a substantially horizontal direction thereby forming a focused vertical image column on the screen 325.

The screen has properties that are described later where the horizontal direction of the output ray corresponds to a given input horizontal direction. The display operates by altering the horizontal directions of the emergent beams during the scan such that they are always directed to the desired eyes, in this case the viewers' 210 and 211 left eyes. FIG. 3(*b*) shows the beam directions at a later time $T_y$, where the illumination on the light valve is at position 327 with the image on the screen at position 328. Apparatus common to both FIGS. 3(*a*) and 3(*b*) is labelled identically. As the 2D light valve is horizontally scanned, the vertical image columns 328 projected on to screen 326 are also scanned across the screen 326. The vertical image columns 328 are vertical image portions of a complete image. The complete image projected in the viewing field, and observable in the exit pupils is formed by a raster scan, wherein the vertical light configurations are scanned across the second substantially planar area, which in this embodiment is screen 326.

Figure 4:
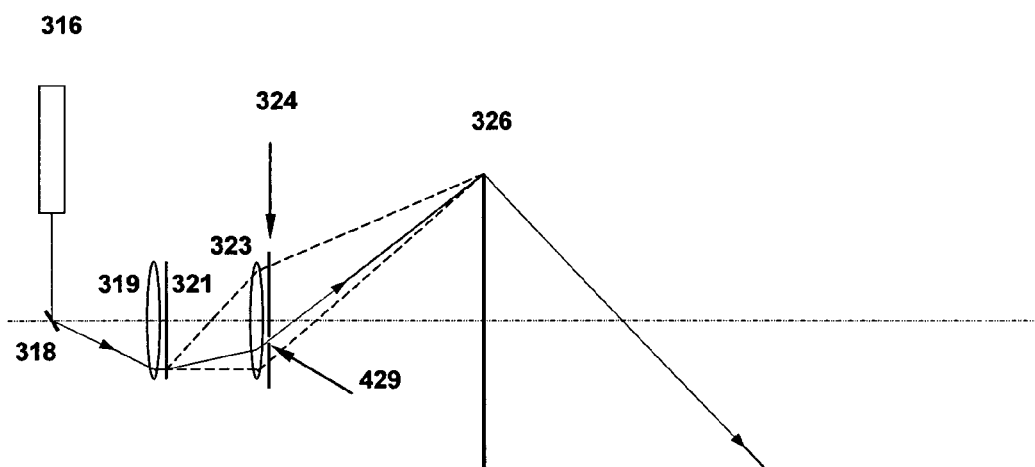
FIG. 4 shows plan (a) and side elevation (b) views of ray diagrams in a simplified depiction of the optics, and illustrates the manner in which the horizontal direction of a vertical light configuration is selected.
Figure 4:
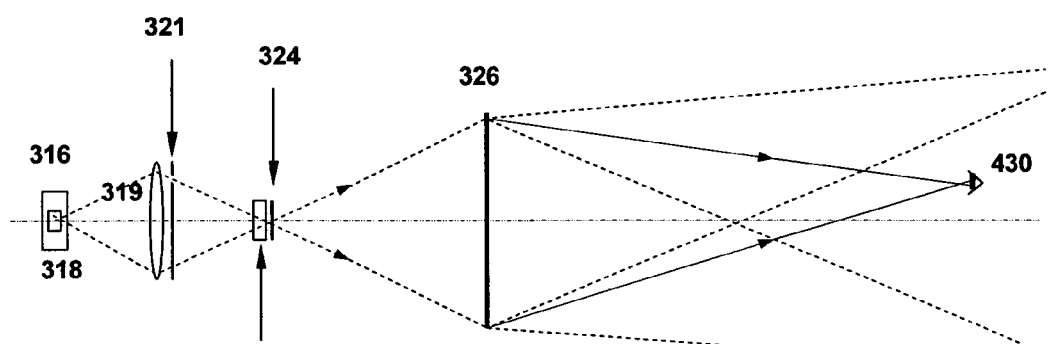

FIG. 4(*a*) is a simplified plan view of the optics and illustrates the manner in which the horizontal direction of a beam is selected. All the rays from a point on the horizontal diffuser 321 will be focused to a point on the screen 326, by lens 323, if all the elements of the linear SLM 324 are allowed to pass light. If only a small region of the SLM 324 transmits light a vertical light configuration or in other words a narrow beam will pass from the screen 326 to the viewer's eye 430. FIG. 4(*b*) is a simplified side elevation showing the light path to the eye 430, clearly depicting a vertical image column being focused in a substantially horizontal direction on the screen 326 by lens 323. Apparatus sharing a common label with any other apparatus featuring in any other figure refers to the same apparatus.

Figure 5:
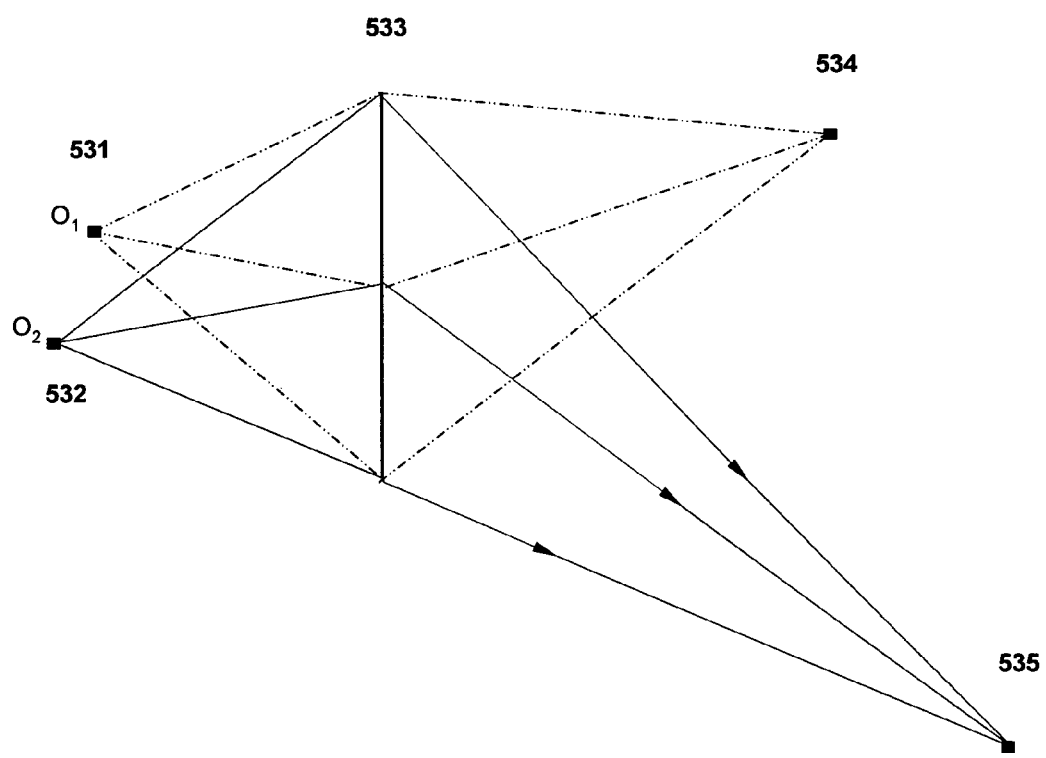
FIG. 5 shows a plan view of a one-dimensional Gabor superlens.

In order for the display to serve viewers who are located over a large area the screen 326 must have the ability to effectively magnify the image at the SLM 324. In a preferred embodiment the horizontal angular emergent characteristics of an emerging vertical light configuration is magnified with respect to the incident angle, thereby extending the angular extent of the viewing field in which exit pupils may be formed. Lens aberrations rule out the use of a conventional lens in this application but a magnifying Gabor superlens is capable of performing this function. A Gabor superlens is an arrangement of two pairs of lenslets located close to each other. In the display this function is only required in the horizontal direction so the superlens may comprise two vertically aligned lenticular sheets in one embodiment. FIG. 5 is the plan view of a one-dimensional Gabor superlens 533. The imaging properties differ from those of a conventional lens in that there is no inversion and conjugate images increase in distance from the lens with increasing object distance. This is illustrated in FIG. 5 where image 534 is the conjugate of object 531 located at position $O_1$, and image 535 is the conjugate of object 532 located at position $O_2$. The imaging properties of the Gabor superlens are widely known in the art and the interested reader is referred to "Imaging properties of the Gabor superlens," by Hembd-Sölner et al., in J. Opt. A: Pure Appl. Opt. 1 (1999) 94-102.

Figure 6:
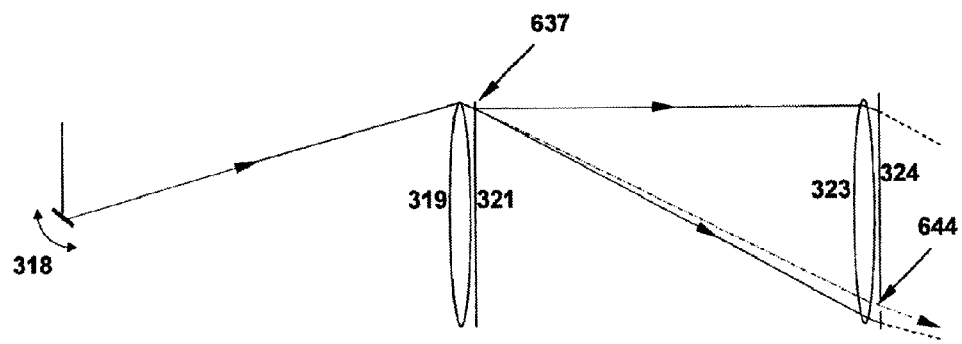
FIG. 6 are plan views that illustrate the manner in which the moving light source of the horizontal scan on the horizontal diffuser is used in conjunction with the spatial light modulator (SLM) to control the vertical light configuration direction.
Figure 6:
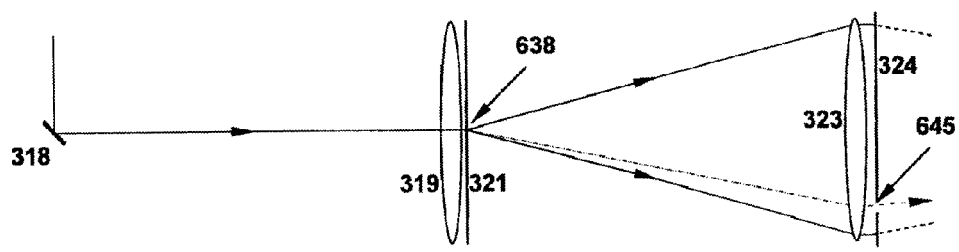
Figure 6:
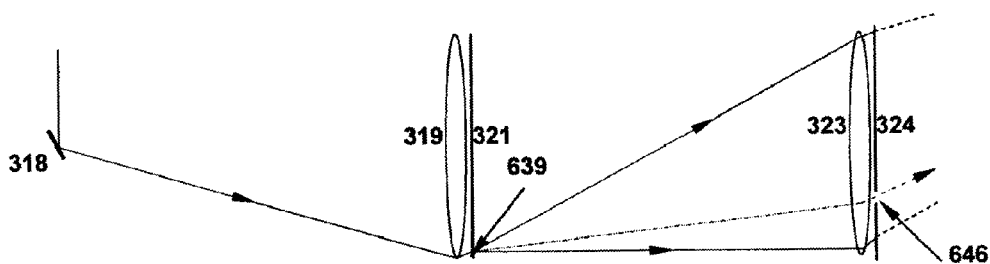
Figure 8:
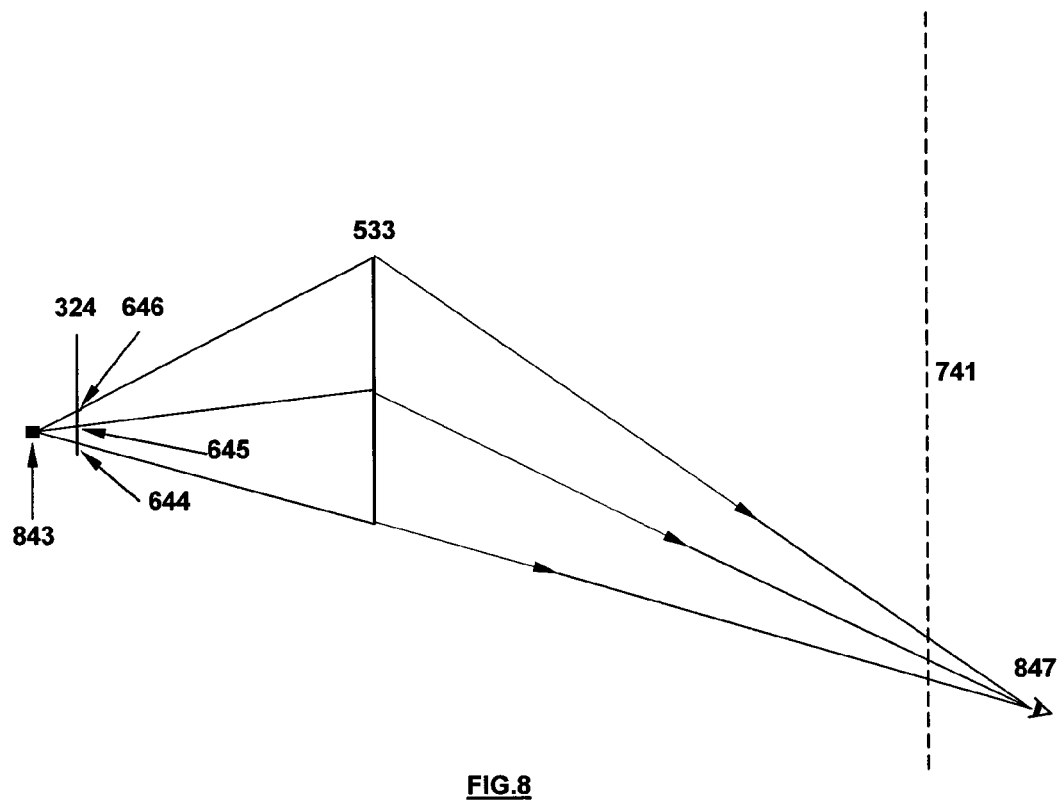
FIG. 8 is a plan view showing the relationship between spatial light modulator (SLM) and a virtual source.

FIG. 6 illustrates the manner in which the moving light source of the horizontal scan on the horizontal diffuser 321 is used in conjunction with the SLM 324 to control the beam direction. At time $t_1$ (FIG. 6(a)) light can exit the SLM 324 at region 644, for a column of illumination positioned at 637; at time $t_2$ (FIG. 6(b)) light can exit the SLM 324 at region 645, for a column of illumination positioned at 638; and at time $t_3$ (FIG. 6(c)) light can exit the SLM 324 at region 646, for a column of illumination positioned at 639. As the exit region moves in the direction opposite to the scan at the horizontal diffuser 321, a virtual source is formed behind the SLM 324 as illustrated in FIG. 8. Note that The scan of the effective light source in this simplified equivalent of the actual display is in the opposite direction to both the scan at the screen and also the scan at the light valve 1266. Apparatus sharing a common label with any other apparatus featuring in any other figure refers to the same apparatus.

Figure 7:
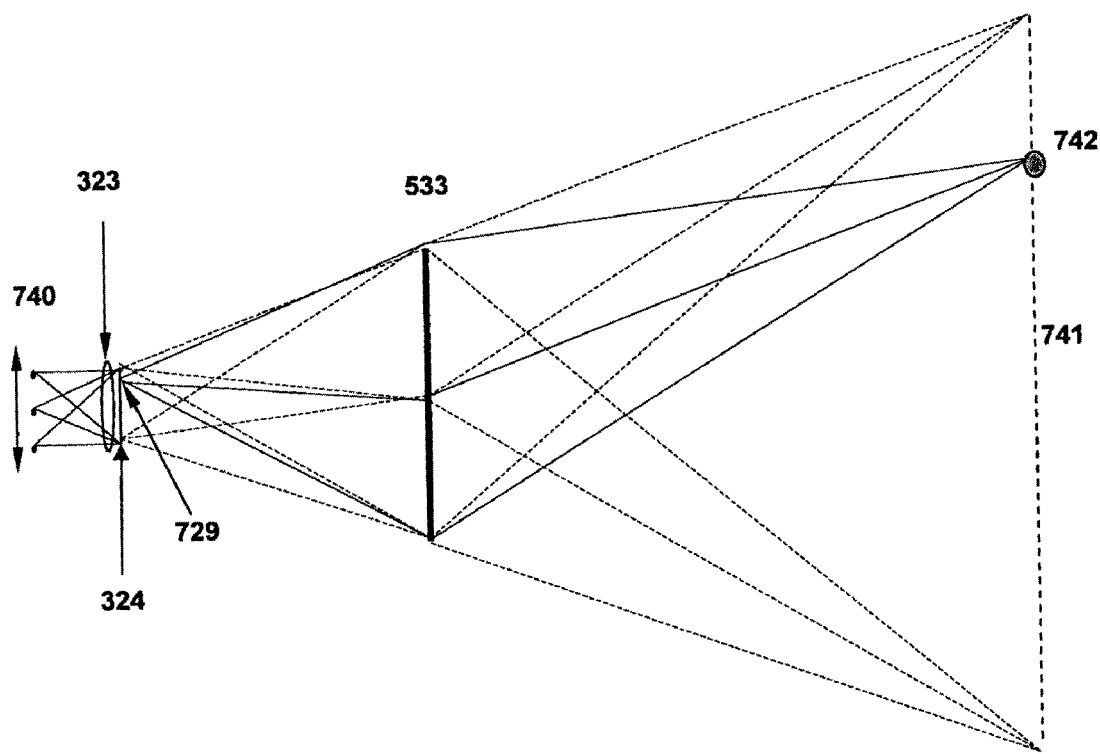
FIG. 7 is a plan view illustrating focussing in the conjugate plane of the spatial light modulator (SLM).

In FIG. 7 the SLM 324 forms a real image 741, indicated by the broken line, in the viewing field. This real image 741 is the conjugate plane of SLM 324. The object, which in this case is a transmission region 729 in the SLM 324, forms a real image 742 which is the exit pupil. Therefore as the laterally moving light source 740 traverses the horizontal diffuser 321 (see FIG. 3) the transmission region 729 does not have to change position.

FIG. 8 illustrates the formation of a virtual source 843 being focused into the viewing field in region 847. The virtual source 843 is behind the SLM 324 with the conditions as in FIG. 6. The viewer's eye, located at exit pupil 847 is therefore further away than the conjugate plane 741. Conversely, when the transmission region moves in the same direction as the scan at the horizontal diffuser 321, the virtual image is in front of the SLM 324 and the exit pupil is closer to the screen 533 than the conjugate plane 741. As the transmission region moves in the same direction as the scan, the time-sequentially transmitted vertical light configurations are converging, thereby forming a virtual source whose position is closer to screen 533. When instead the transmission region moves in a direction opposite to the scan, as depicted in both FIG. 6 and FIG. 8 the time-sequentially transmitted vertical light configurations are diverging, and the virtual source position 843 appears further from screen 533, resulting in an exit pupil being formed further from the screen than the conjugate plane 741 of the SLM. When the transmission region does not move during the scan an exit pupil is formed in the conjugate image plane 741 of the SLM 324.

In summary, in preferred embodiments the position of the exit pupil in the viewing field is dependent on the position of the virtual source 843, the virtual source 843 position being dependent on the behaviour of the transmission region in the SLM 324 during a scan of the horizontal diffuser 321. A static transmission region produces a virtual source position being formed in the transmission region of the SLM 324, resulting in an exit pupil being formed in the conjugate plane 741 of the SLM 324. A dynamic transmission region results in a virtual source position having a longitudinal position lying outside the transmission region of the SLM 324—either closer to the screen 533 or further from the screen 533 than the SLM 324. In both situations the lateral position of the formed exit pupil is at least partly dependent on the one or more lateral positions of the transmission regions of the SLM 324.

Figure 9:
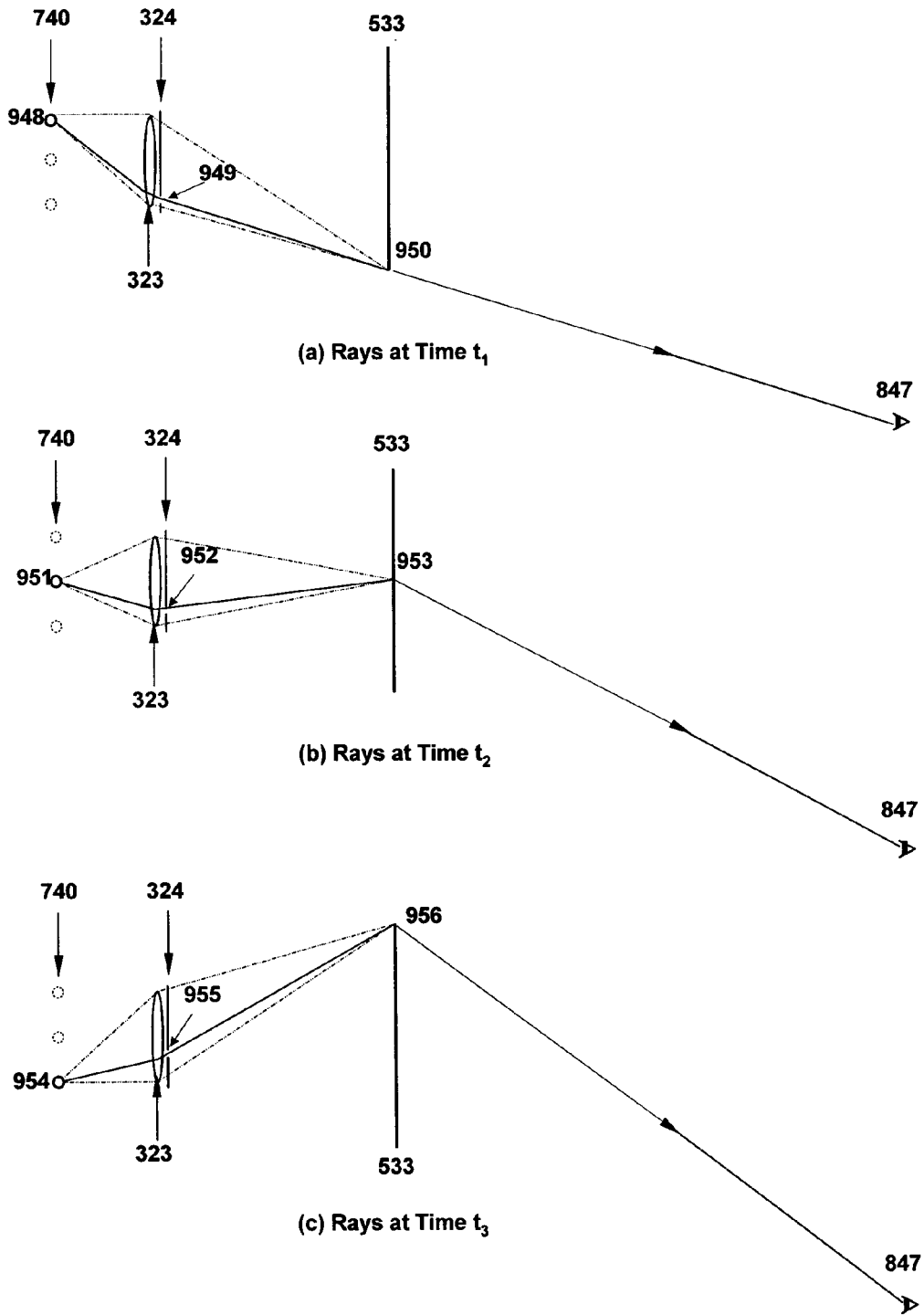
FIG. 9 shows the overall light paths from the horizontal diffuser to the viewer's eye and the manner in which the exit pupil is formed over a period of time.

FIG. 9 shows the overall light paths from the horizontal diffuser 321 to the viewer's eye 847 and the manner in which the exit pupil is formed in time. The exit pupil is formed at the viewer's eye position 847. In the current FIG. 847 is used to refer to both the viewer's eye position and to the exit pupil position.

At time $t_1$ (FIG. 9(a)) the light from illumination source position 948 (the source position being equivalent to the position of a column of illumination in the horizontal diffuser 321) is focused by lens 323, passes through the SLM 324 at region 949, passes through the screen 533 at region 950 and continues to the viewer's eye located at the exit pupil 847.

At time $t_2$ (FIG. 9(b)) the light from illumination source position 951 is focused by lens 323, passes through the SLM 324 at region 952, passes through the screen 533 at region 953 and continues to the viewer's eye located at the exit pupil 847.

At time $t_3$ (FIG. 9(c)) the light from illumination source position 954 is focused by lens 323, passes through the SLM 324 at region 955, passes through the screen 533 at region 956 and continues to the viewer's eye located at the exit pupil 847.

This action can be considered as dynamic exit pupil formation.

Figure 10:
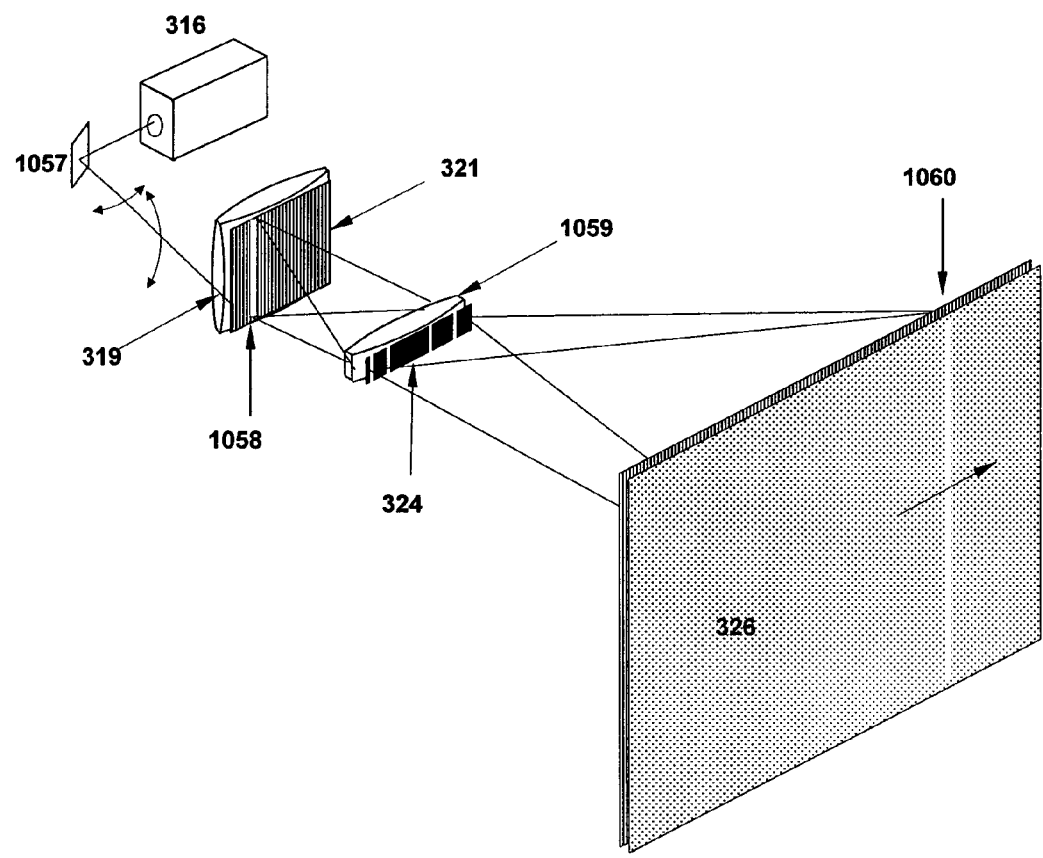
FIG. 10 is a perspective view illustrating an embodiment of the display where the images are formed by x-y scanning.

FIG. 10 illustrates an embodiment of the display where the images are formed by x-y scanning. If the light from the laser 316 is modulated in wavelength and intensity its output can be scanned by an x-y scanning device 1057 in order to produce a column of the image 1058 on the horizontal diffuser 321, which is then projected onto screen 326 at position 1060. In such embodiments the x-y scanning device 1057 may be a MEMS wherein reflected beams may be redirected in both a horizontal and a vertical direction. Alternatively a moving mirror having two degrees of rotational freedom, in the both the x and y directions, may be used. In the current embodiment the 2D light valve 320 is not present. The scan is performed first in the vertical direction across the horizontal diffuser 321, thereby providing vertical scanning across the second substantially planar area, and then in a horizontal direction across the horizontal diffuser 321. The operation of the display from the horizontal diffuser 321 to the viewers is identical to that described for the simplified display with the exception that lens 1059 is a cylindrical lens whose axis is vertical.

Figure 11:
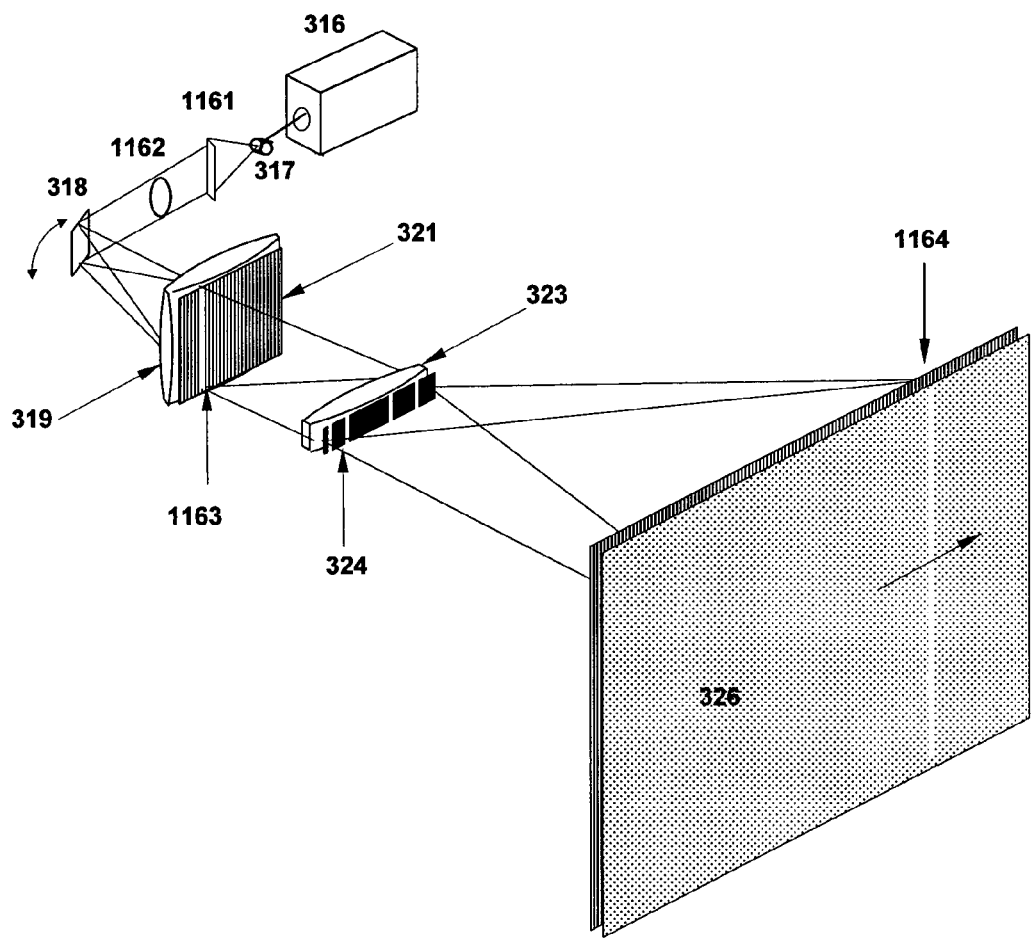
FIG. 11 is a perspective view illustrating an embodiment of the display where the images are formed by a linear light valve and horizontal scanning.

FIG. 11 illustrates an embodiment of the display where the images are formed by a linear light valve 1161. Light from laser 316 passes through beam shaping optics 317 where the beam is converted to a vertical fan of rays. This illuminates a linear light valve 1161 whose output is focused by lens 1162 on to the horizontal diffuser 321 to form the column of the image 1163. The output of the light valve 1161 is scanned horizontally by the scanning device 318 to form an image on the horizontal diffuser 321, which is then projected onto screen 326 at position 1164. In this case the 2D light valve 320 is not present. The operation of the display from the horizontal diffuser 321 to the viewers is identical to that described for the simplified display. The light valve 1161 may be reflective or transmissive. The light valve 1161 may operate in the conventional attenuation of radiation mode or it can be a diffractive element where the image on the horizontal diffuser 321 is formed by interference of light.

Figure 12:
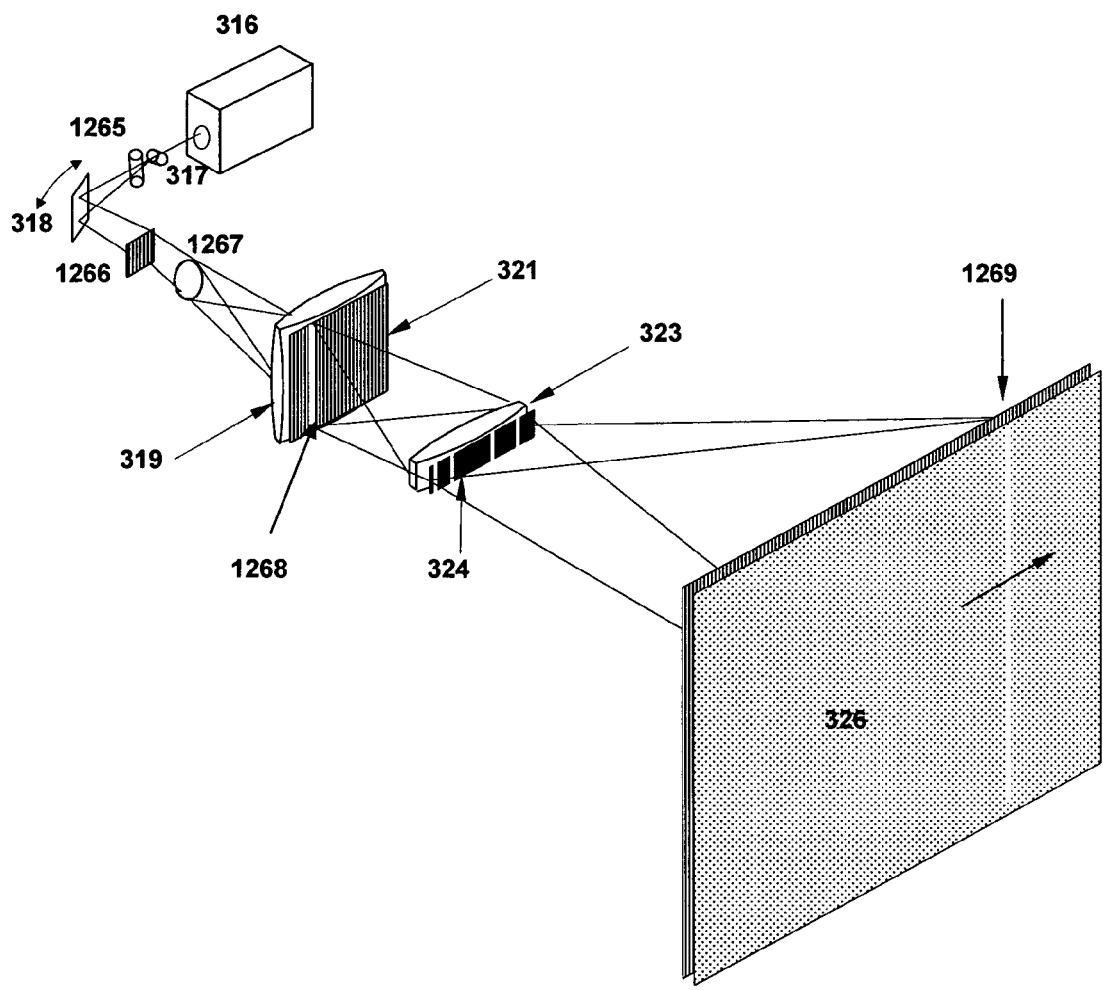
FIG. 12 is a perspective view illustrating an embodiment of the display where the images are formed by a small two-dimensional (2D) light valve, and employing a horizontal scanner.
Figure 13:
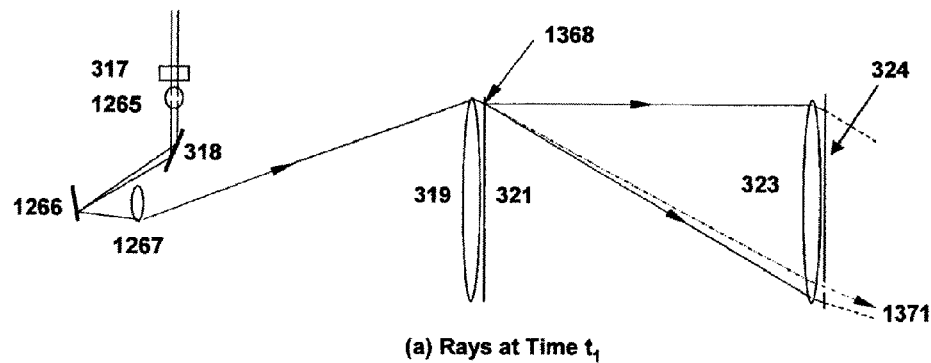
FIG. 13 is a plan view of the means of performing the column-sequential illumination of a small two-dimensional (2D) light valve.
Figure 13:
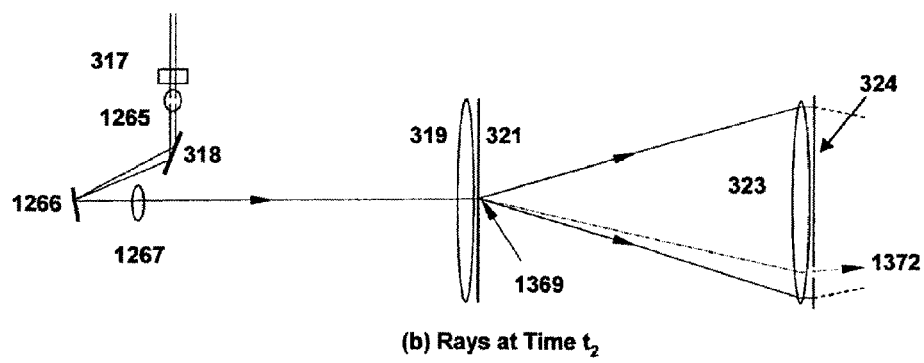
Figure 13:
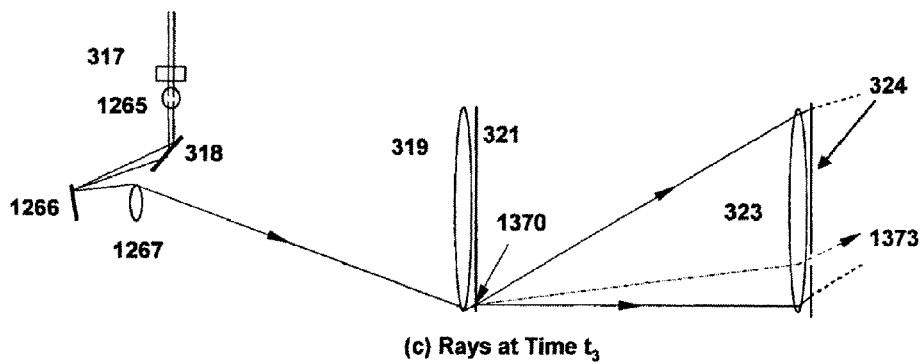

FIG. 12 and FIG. 13 illustrate an embodiment of the display where the images are formed by a small two-dimensional (2D) light valve 1266. This may be reflective or transmissive. Light from laser 316 passes through beam shaping optics 317 and 1265 that focuses the beam to a very narrow vertical fan of rays on the light valve 1266. The selectively attenuated rays emerging from the two-dimensional light valve 1266 are scanned horizontally by scanner 318 to focus on the horizontal diffuser 321 via projector lens 1267 and lens 319. The attenuated rays form an image on the horizontal diffuser 321 at a position 1268 which is projected onto screen 326 at position 1269. In this case the 2D light valve 320 is not present. The operation of the display from the horizontal diffuser 321 to the viewers is identical to that described for the simplified display. In this embodiment the two-dimensional light valve 1266 acts in the same manner as a one-dimensional light valve 1161 with the exception that the horizontal scanning is performed on the input beam. The use of a small 2D light valve 1266 together with a projector lens 1267 has advantages over the previous embodiment using a 2D light valve placed between lens 319 and horizontal diffuser 321. The size of the light valve may be much smaller considering that the generated image is projected onto the horizontal diffuser 321, the angle of rotation of the scanner 318 is less, resulting in an increase in speed and a decrease in component size.

FIG. 13 illustrates dynamic exit pupil formation for the embodiment illustrated in FIG. 12 with the exception that light valve 1266 is reflective rather than transmissive. At time $t_1$ (FIG. 13(a)) the effective illumination source position 1368 is focused by lens 323 and passes through the SLM 324 at region 1371. At time $t_2$ (FIG. 13(b)) the effective illumination source position 1369 is focused by lens 323 and passes through the SLM 324 at region 1372. At time $t_3$ (FIG. 13(c)) the effective illumination source position 1370 is focused by lens 323 and passes through the SLM 324 at region 1373. The dynamic exit pupil formation is the same as described in previous embodiments and illustrated in FIG. 9(a-c).

Figure 14:
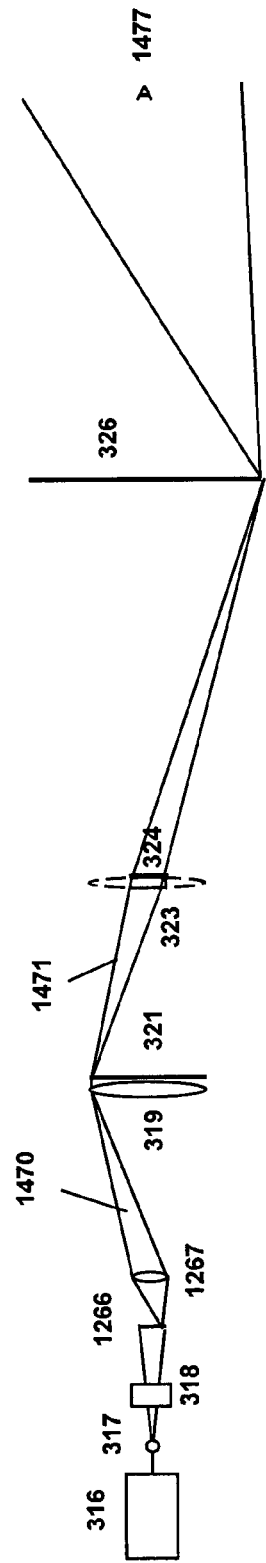
FIG. 14 shows plan (a) and side elevation (b) views of the light paths for light emitted from one image pixel in an embodiment of the display where images are formed by a small two-dimensional (2D) light valve.
Figure 14:
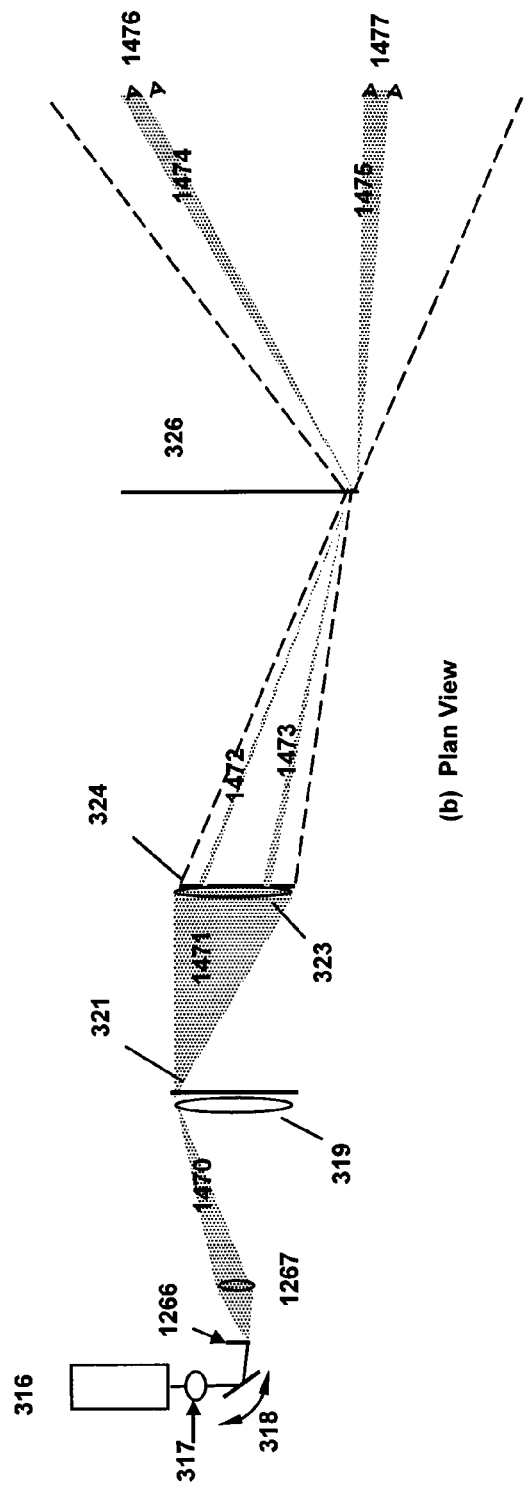

FIGS. 14(a) and (b) are side elevation and plan views of a ray diagram of the small 2D light valve embodiment of the display where the production of exit pupils is shown. For illustrative purposes only the light rays of light emitted for one image pixel are shown. The beam 1470 is focused on the horizontal diffuser 321 by the projector lens 1267. The ray bundle 1471 is formed by the focused light of lens 319 being scattered by the diffuser 321. The emergent ray bundle 1471 is selectively blocked by SLM 324 into the beams 1472 and 1473, which are clearly observable in the plan view (FIG. 14(b)). After passing through the screen 326 these are redirected to the eyes by beams 1474 and 1475 to viewers 1476 and 1477 respectively. Note that the light paths are indicated by shaded regions in FIG. 14(b).

Figure 15:
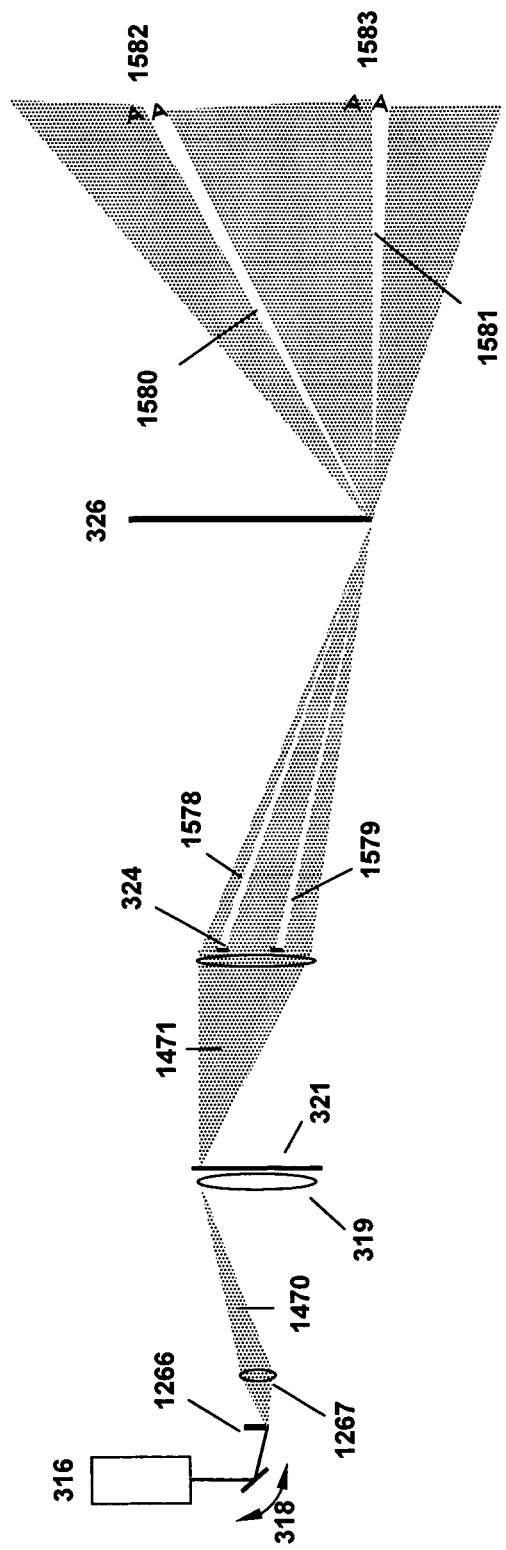
FIG. 15 is a plan diagram showing the light paths in an embodiment of the display employing a method of blocking light where images are formed by a small two-dimensional (2D) light valve.

FIG. 15 is a ray diagram of the same embodiment of the display showing the manner in which two blocked regions, also referred to as shadow regions 1580 and 1581 can be formed. SLM 324 selectively blocks regions 1578 and 1579. After passing through screen 326 these are redirected to the appropriate eyes by shadow regions 1580 and 1581. In this manner the selected eyes, which in the depicted embodiment coincide with left eyes 1582 and 1583 of the two viewers, are blocked from observing an image, whilst the right eyes see the projected image.

Figure 16:
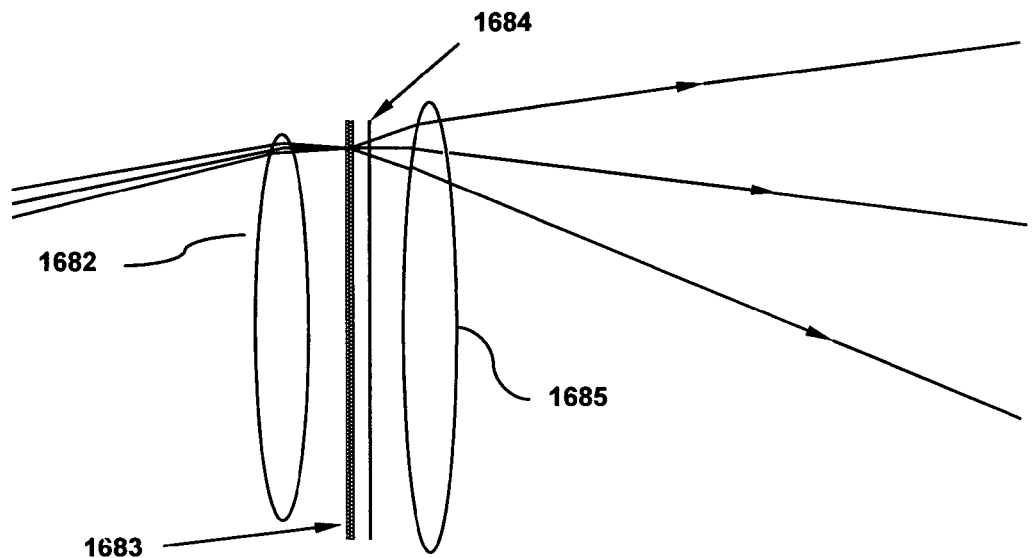
FIG. 16 is a plan (a) and side elevation (b) view showing the components of the screen used in the display.
Figure 16:
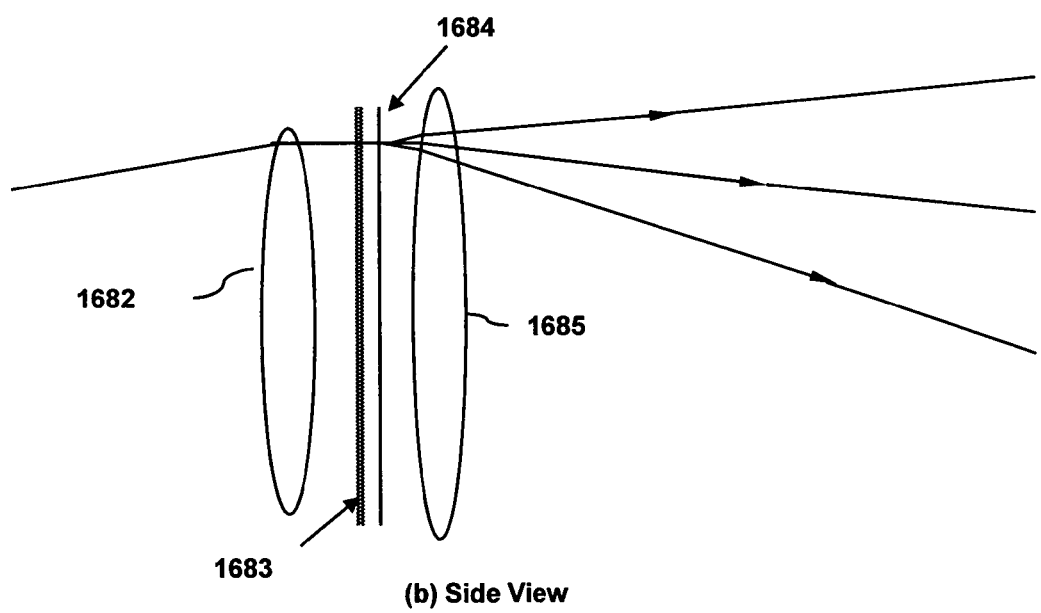

FIGS. 16(a) and (b) are plan and side elevation views illustrating the components of the screen 326 used in a preferred embodiment of the current invention. Convex lens 1682 collimates the input light so that it is approximately normal to the surface of the Gabor superlens 1683. The superlens 1683 provides angular magnification to the input rays in the horizontal direction. The vertical diffuser 1684 spreads the light in the vertical direction in order to allow a viewer over a range of vertical positions to see even brightness over the height of the screen 326. The convex field lens 1685 concentrates the light to the viewers in the vertical plane and also provides a viewing field with a more useful footprint in the horizontal plane. In alternative embodiments of the invention convex lens 1682 is not present. In yet further alternative embodiments convex field lens 1685 and/or convex lens 1682 are not present.

Figure 17:
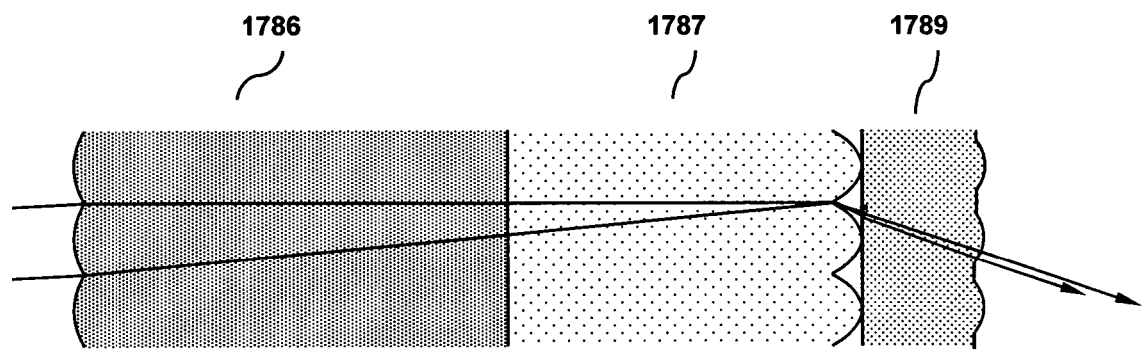
FIG. 17 shows a plan view of a section of one embodiment of the screen.

FIG. 17 is the plan view of a section of one embodiment of the superlens screen 1683. Each section acts as a small telescope where the lenslet on substrate 1786 is the objective, the lenslet on substrate 1787 is the field lens and the lenslet on substrate 1789 is the equivalent of the eyepiece. Other embodiments may be a holographic optical element (HOE) or a hybrid screen comprising both refractive and HOE components.

Alternative Embodiments

Figure 18:
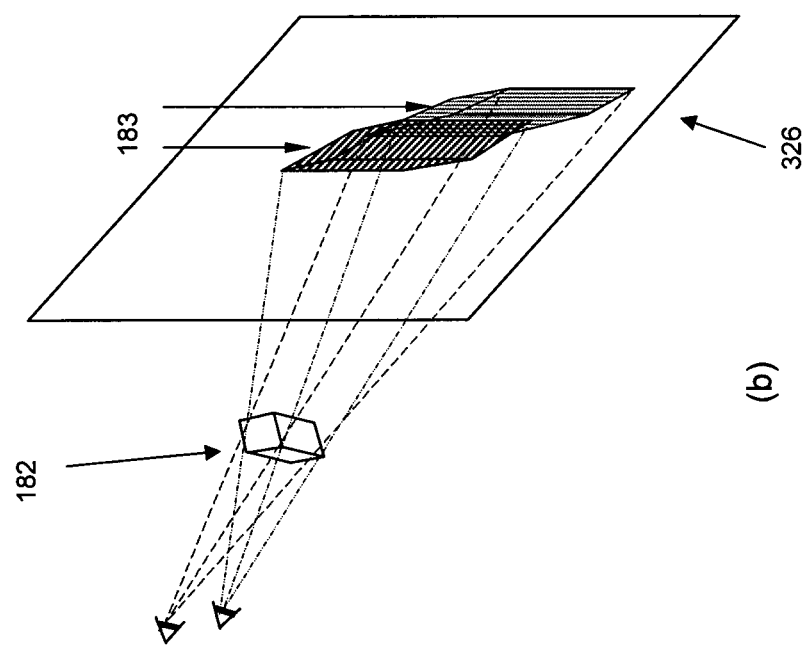
FIG. 18 is a plan (a) and side elevation (b) view showing the "Near-Field" embodiment of the display.
Figure 18:
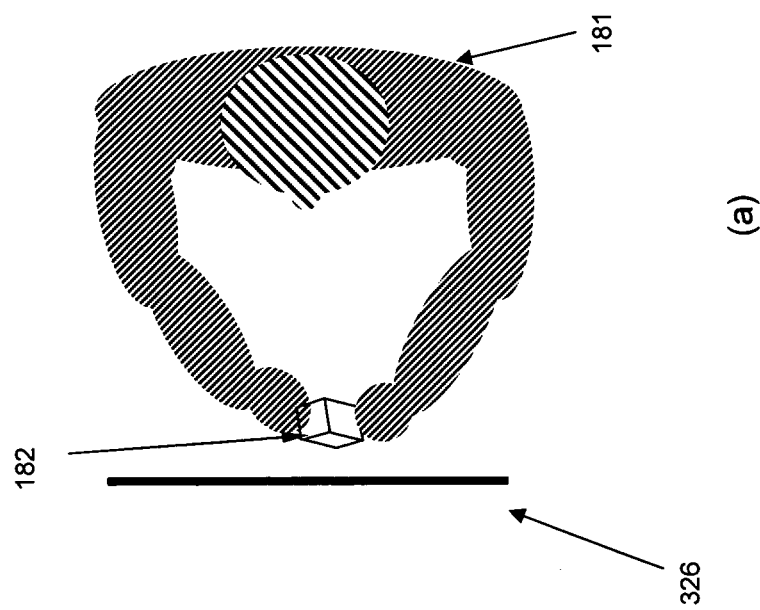

In an alternative embodiment, the present invention may also function in a near-field mode of operation. FIG. 18 illustrates such an embodiment. FIG. 18(a) illustrates a viewer 181 positioned a short distance from screen 326. A three dimensional (3D) stereo image 182 is observable a short distance from the viewer's 181 position. In preferred embodiments the stereo image 182 is formed within arms reach from the viewer 181. FIG. 18(b) illustrates how the stereo image 182 is formed. Left and right images 183 are projected on screen 326 as described in previous embodiments. The apparent position of the 3D stereo image 182 in the viewing field is at least partly dependent on the amount of parallax between the left and right images 183. In general the more parallax between the left and right images 183 the closer to the viewer the 3D stereo image 182 appears. Equally the less parallax present between left and right images 183 the further from the viewer the 3D stereo image 182 appears. In preferred embodiments of the present invention the pupil position tracker 3 (not displayed in FIG. 18) includes a means for recognizing a predefined viewer hand gesture, on the basis of which the stereo image 182 may be manipulated. In such embodiments it is envisioned that the perspective of the image 182 may be changed, for example the image 182 may be rotated along any rotational axis. It is also envisioned that the size of the 3D stereo image may be changed. In preferred embodiments the pupil position tracker 3 recognizes a predefined viewer hand gesture as indicative of a predefined instruction and sends the instruction to the image generation means 1, which may be an instruction to manipulate the projected images by rotating the right and left images 183 by a finite amount, or to resize the right and left images 183, which may be achieved by reconfiguring the image generation means 1 accordingly. In embodiments using light valves to generate the right and left images 183 this may comprise reconfiguring the light valves such that transmitted light projects the desired perspective image, and/or the correct sized image.

In an alternative embodiment a separate viewer hand gesture recognition means may be used. Or alternatively an alternative predefined viewer command may be utilised to manipulate the stereo image 182.

As with the previously disclosed embodiments the near-field operation may operate in either single or multi-user modes. When operating in multi-user modes each viewer may observe either the same stereo image, different 3D perspectives of the same object image, or alternatively different stereo images corresponding to different object images in a near-field private viewing mode of operation.

In an alternative embodiment of the present invention the first substantially planar area may be replaced by an array of steerable, selectively modulated light sources, wherein each light source is capable of generating a plurality of sets of vertical light configurations. In such embodiments it is envisioned that each steerable light source present in the array is capable of selectively generating and projecting a plurality of different wavelengths and intensity modulated light beams. It is envisioned that each steerable light source projects a beam of light directly onto the screen 326. In certain embodiments the steerable light sources provide for x-y scanning directly on screen 326. It is envisioned that a different steerable light source is assigned to each different viewer.

In another embodiment of the present invention it is envisaged that the display apparatus is arranged to minimize the volume occupied by the display apparatus. This may be achieved by introducing reflective mirrors or other such devices, placed in the light paths of the vertical light configurations, or by reorienting any one of the apparatus comprising the display. In such embodiments it is envisaged that horizontal orientations may become interchanged with vertical orientations and vice versa. For example in such embodiments rather than having a horizontal diffuser one may have a vertical diffuser, vertical light configurations may be replaced by horizontal light configurations. Any use of the terms "horizontal" or "vertical" in the current specification is to be understood as indicating "horizontal-equivalent" or "vertical-equivalent" and is indicative of anything which has the effect of providing for horizontal or vertical character in emergent light when received by the eyes.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A display apparatus for projecting images towards eyes of at least one viewer selectively when said eyes are spaced horizontally within a viewing field, said apparatus comprising:
   an image generator for generating different images, each image being formed by horizontal scanning of vertical image areas; and
   a light configurator including:
      a spatial light modulator having at least one exit region for forming a vertical light configuration for each vertical image area, the exit region being horizontally movable in dependence on a position of a selected one of said eyes;
      a screen; and
      a transmitter for transmitting light from the image generator to the spatial light modulator,
   wherein the vertical light configurations during scanning of one of said different images form a source that is imaged by the screen to an exit pupil substantially coincident with the position of the selected one of said eyes and not with the position of the other eye, and
   wherein the display apparatus includes a controller for controlling the position of the exit region in dependence on the position of said each vertical image area such that the longitudinal position of the source relative to the spatial light modulator is controllable, the longitudinal direction being orthogonal to the screen.

2. A display apparatus according to claim 1, wherein said light configurator is adapted to provide horizontal scanning across the screen.

3. A display apparatus according to claim 1, wherein said light configurator is adapted to simultaneously project light vertically across said vertical light configurations so as to provide simultaneous illumination vertically across the screen.

4. A display apparatus according to claim 1, wherein said image generator comprises:
   light generator for generating light; and
   a modulator for modulating intensity and wavelength of said generated light.

5. A display apparatus according to claim 1, wherein said light configurator is adapted to scan light vertically across said vertical light configurations so as to provide vertical scanning across the screen.

6. A display apparatus according to claim 1, wherein said image generator comprises:
   a light source for generating wavelength and intensity modulated light; and
   a scanner for providing vertical and horizontal scanning of said light configurator with said modulated light, thereby providing for both horizontal and vertical scanning across the screen.

7. A display apparatus according to claim 1, wherein said display is adapted to project an image to a plurality of viewers' eyes, the spatial light modulator having a plurality of exit regions for forming a plurality of vertical light configurations from one vertical light area for a selected eye of the plurality of viewers.

8. A display apparatus according to claim 1, wherein said apparatus is arranged to project a stereo image towards the eyes of said one or more viewers, said stereo image being comprised of a pair of eye-specific images, and wherein said apparatus is comprised of:
   a light configurator adapted to provide a plurality of sets of vertical light configurations, said plurality of sets including:
   a first plurality of sets of vertical light configurations projected to positions substantially coinciding with a first eye selected from each of said one or more viewer's eyes, thereby projecting a first eye-specific image to said one or more viewer's first eye; and
   a second plurality of sets of vertical light configurations projected to positions substantially coinciding with a second eye selected from each of said one or more viewer's eyes, thereby projecting a second eye-specific image to said one or more viewer's second eye.

9. A display apparatus according to claim 1, wherein said light configurator comprises:
a converger for converging said transmitted light to the screen.

10. A display apparatus according to claim 1, wherein the positions of said exit pupils within said viewing field are dependent on the positions of one or more sources selected on the basis of said one or more viewer's generated eye position data, said apparatus comprising:
a selector adapted to select the position of said one or more sources on the basis of said eye position data.

11. A display apparatus according to claim 10, wherein said positions of said one or more sources are dependent on both the horizontal scanning of the vertical image areas and the horizontal moving of the one or more exit regions, said controller for controlling the position of the exit region being adapted to select and vary both said horizontal scanning and said horizontal movement, so as to maintain said positions of said one or more sources substantially consistent with said one or more viewer's generated eye position data.

12. A display apparatus according to claim 1, in which the controller for controlling the position of the exit region is adapted for moving the exit region in the same direction as the horizontal scanning of the vertical image areas for positioning the source between the spatial light modulator and the screen and for moving the exit region in a direction opposite to the horizontal scanning of the vertical image areas for positioning the source between the spatial light modulator and the transmitter.

13. A display apparatus according to claim 1, comprising a set of one or more lenticular sheets, said sheets being comprised of an array of lenslets; said one or more sheets being arranged in substantially adjacent planar areas.

14. A display apparatus according to claim 1, wherein said apparatus is arranged to project different stereo images towards the eyes of one or more different viewers, each of said different stereo images being comprised of a different pair of eye-specific images, and wherein a plurality of sets include:
a first plurality of sequentially activated sets of vertical light configurations sequentially projected to positions substantially coinciding with the eye positions of a first viewer, thereby sequentially projecting a first pair of eye-specific images to said eye positions of said first viewer; and
a second plurality of sequentially activated sets of vertical light configurations sequentially projected to positions substantially coinciding with the eye positions of a second viewer, thereby sequentially projecting a second pair of eye-specific images to said eye positions of said second viewer.

15. A display apparatus according to claim 1, including a lens for projecting the different images onto the screen.

16. A display apparatus for projecting images, said apparatus comprising:
an image generator configured to generate images by horizontal scanning of vertical image areas;
a light configurator including:
a spatial light modulator configured to receive light generated by said vertical image areas and to generate an exit region that forms vertical light configurations from the light generated by said vertical image areas, each of the vertical light configurations corresponding to one of the vertical image areas, and
a screen; and
a controller configured to, by controlling a horizontal position of the exit region:
variably control a longitudinal position of a source that is imaged by the screen to an exit pupil, where the longitudinal direction is orthogonal to the screen, and variably control a horizontal position of the exit pupil,
wherein the source is formed by the vertical light configurations formed by the exit region when the vertical image areas are scanned.

17. A display apparatus according to claim 16, wherein the controller is configured to variably control the horizontal position of the exit pupil such that, while the vertical image areas are being scanned to form a given image, the exit pupil is substantially coincident with the position of a selected one of the eyes of an observer and not coincident with the position of the other eye of the observer.

18. A display apparatus for projecting images, said apparatus comprising:
an image generator configured to generate images by horizontal scanning of vertical image areas;
a light configurator including:
a spatial light modulator configured to receive light generated by said vertical image areas and to generate an exit region that forms vertical light configurations from the light generated by said vertical image areas, each of the vertical light configurations corresponding to one of the vertical image areas, and
a screen; and
a controller configured to, by controlling a horizontal position of the exit region, variably control a three-dimensional position of an exit pupil.

19. A display apparatus according to claim 18, wherein the controller is configured to variably control the three-dimensional position of the exit pupil such that, while the vertical image areas are being scanned to form a given image, the exit pupil is substantially coincident with the position of a selected one of the eyes of an observer and not coincident with the position of the other eye of the observer.

* * * * *